United States Patent
Wu et al.

(10) Patent No.: US 10,832,862 B2
(45) Date of Patent: Nov. 10, 2020

(54) WIRELESS SYSTEM AND WIRELESS DEVICE

(71) Applicant: TDK TAIWAN CORP., Taoyuan (TW)

(72) Inventors: Tsang-Feng Wu, Taoyuan (TW);
Kun-Ying Lee, Taoyuan (TW);
Yi-Chen Lin, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 85 days.

(21) Appl. No.: 16/197,778

(22) Filed: Nov. 21, 2018

(65) Prior Publication Data

US 2019/0156995 A1     May 23, 2019

Related U.S. Application Data

(60) Provisional application No. 62/595,820, filed on Dec. 7, 2017.

(30) Foreign Application Priority Data

Nov. 14, 2018    (CN) .......................... 2018 1 1352740

(51) Int. Cl.
| | |
|---|---|
| *H01F 38/14* | (2006.01) |
| *H02J 7/02* | (2016.01) |
| *H02J 50/10* | (2016.01) |
| *H01F 27/28* | (2006.01) |
| *H02J 50/70* | (2016.01) |
| *H02J 50/12* | (2016.01) |
| *H01F 27/29* | (2006.01) |

(52) U.S. Cl.
CPC .......... *H01F 38/14* (2013.01); *H01F 27/2804* (2013.01); *H01F 27/2823* (2013.01); *H02J 7/025* (2013.01); *H02J 50/10* (2016.02); *H02J 50/12* (2016.02); *H02J 50/70* (2016.02); *H01F 27/29* (2013.01)

(58) Field of Classification Search
CPC .. H01F 38/14; H01F 27/2804; H01F 27/2823; H01F 27/29; H02J 50/10; H02J 50/12; H02J 50/70; H02J 7/025
See application file for complete search history.

(56) References Cited

U.S. PATENT DOCUMENTS

| | | | | |
|---|---|---|---|---|
| 2013/0009488 | A1* | 1/2013 | Choe | ........................ H02J 5/005 307/104 |
| 2015/0381239 | A1* | 12/2015 | Shostak | ............... H04B 5/0037 455/41.1 |
| 2017/0228721 | A1* | 8/2017 | Lee | ....................... H04B 5/0081 |

\* cited by examiner

*Primary Examiner* — Carlos Amaya
(74) *Attorney, Agent, or Firm* — Muncy, Geissler, Olds & Lowe, P.C.

(57) ABSTRACT

A wireless system is provided and includes a first coil, a second coil, and a capacitance adjusting unit. The second coil is configured to sense the first coil. The capacitance adjusting unit is connected to the first coil, the capacitance adjusting unit includes at least one closed loop and a connecting wire, and the connecting wire is connected between the first coil and the closed loop.

12 Claims, 14 Drawing Sheets

WIRELESS SYSTEM AND WIRELESS DEVICE

CROSS REFERENCE TO RELATED APPLICATIONS

This application claims priority of U.S. Provisional Application No. 62/595,820, filed on Dec. 7, 2017 under 35 U.S.C. § 119(e); and this application claims priority of Application No. 201811352740.6 filed on Nov. 14, 2018 under 35 U.S.C. § 119, the entirety of which are incorporated by reference herein.

BACKGROUND OF THE DISCLOSURE

Field of the Disclosure

The present disclosure relates to a wireless system, and more particularly to a wireless system capable of reducing electromagnetic interference.

Description of the Related Art

As technology has progressed, many kinds of electronic devices such as tablet computers and smartphones have begun to include the functionality of wireless charging. A user can place the electronic device on a wireless charging transmitting terminal, so that the wireless charging receiving terminal in the electronic device can generate current to charge the battery by electromagnetic induction or electromagnetic resonance. Due to the convenience of wireless charging, electronic devices equipped with wireless charging modules have gradually become popular.

In general, a wireless charging device includes a magnetic conductive plate to support a coil. When the coil is provided with electricity to operate in a wireless charging mode or a wireless communication mode, the magnetic conductive plate can concentrate the magnetic lines of force emitted from the coil for better performance. However, existing wireless devices generate electromagnetic waves during operation, thereby resulting in electromagnetic interference to other electronic devices around the wireless device.

Therefore, how to design a wireless device that can reduce electromagnetic interference and maintain the same operational performance is a topic nowadays that needs to be discussed and solved.

BRIEF SUMMARY OF THE DISCLOSURE

Accordingly, one objective of the present disclosure is to provide a wireless system to solve the above problems.

According to some embodiments of the disclosure, a wireless system is provided and includes a first coil, a second coil, and a capacitance adjusting unit. The second coil is configured to sense the first coil. The capacitance adjusting unit is connected to the first coil, the capacitance adjusting unit includes at least one closed loop and a connecting wire, and the connecting wire is connected between the first coil and the closed loop.

According to some embodiments, the closed loop only has one connecting end point configured to be connected to the connecting wire.

According to some embodiments, the first coil includes a spiral structure, and the spiral structure forms a hollow region. The closed loop is disposed in the hollow region.

According to some embodiments, the first coil includes a spiral structure, and the spiral structure forms a hollow region. The closed loop is disposed outside the hollow region.

According to some embodiments of the disclosure, the number of turns in the closed loop is at least two.

According to some embodiments, the first coil includes a first metal wire and a second metal wire respectively disposed on a first plane and a second plane, and a winding direction of the first metal wire is opposite to a winding direction of the second metal wire.

According to some embodiments, the first metal wire has a first end, the second metal wire has a first end and a second end, and the first end of the first metal wire is electrically connected to the first end of the second metal wire, so that the first metal wire is connected to the second wire in series.

According to some embodiments, the closed loop is connected to the second end of the second metal wire by the connecting wire.

According to some embodiments, the first coil has a signal transmitting coil.

According to some embodiments, the first coil has a signal receiving coil.

According to some embodiments, the closed loop includes a first closed wiring and a second closed wiring, and the second closed wiring is located in the first closed wiring and is not connected to the first closed wiring.

According to some embodiments of the disclosure, a wireless system is provided and includes a first coil, a second coil, and a capacitance adjusting unit. The second coil is configured to sense the first coil. The capacitance adjusting unit is connected to the first coil. The capacitance adjusting unit includes a variable capacitor and a connecting wire. The connecting wire is connected between the first coil and the variable capacitor, and one end of the variable capacitor is electrically grounded.

According to some embodiments of the disclosure, a wireless system is provided and includes a first coil, a second coil, and a capacitance adjusting unit. The second coil is configured to sense the first coil. The capacitance adjusting unit surrounds the first coil. The capacitance adjusting unit includes at least one closed loop and is electrically independent from the first coil.

According to some embodiments of the disclosure, a wireless system is provided and includes a first coil and a capacitance adjusting unit. The first coil includes a first metal wire and a second metal wire. The first metal wire is disposed on a first plane and has a first spiral structure. The second metal wire is disposed on a second plane and has a second spiral structure. The second metal wire is electrically connected to the first metal wire. The capacitance adjusting unit is connected to the first coil. The capacitance adjusting unit includes at least one closed loop and a connecting wire, and the connecting wire is connected between the first coil and the closed loop.

The present disclosure provides a wireless system including a first coil and a second coil. When the first coil is provided with electricity, the second coil is configured to sense the first coil to generate electric power. In various embodiments of the present disclosure, the wireless system may include a capacitance adjusting unit configured to be electrically connected to the first coil (or the second coil) to change the capacitance value between layers of the first coil, thereby reducing the electromagnetic interference to other electronic devices due to the electromagnetic waves generated by the transmitting terminal device.

In addition, disposing the capacitance adjusting unit does not change the inductance value and the impedance value of the first coil, and thus does not affect the performance of the transmitting terminal device during wireless charging. In some embodiments, the capacitance adjusting unit can include a closed loop and a connecting wire. The closed loop is formed by a wire, and the closed loop only has one connecting end point which is connected to the connecting wire.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that component for specific description or specific figures can be present in any form with which a skilled person is familiar. In addition, when a layer is "above" other layers or a substrate, it might be "directly" on the layers or the substrate, or some other layers may be between the layer and the other layers.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 1:
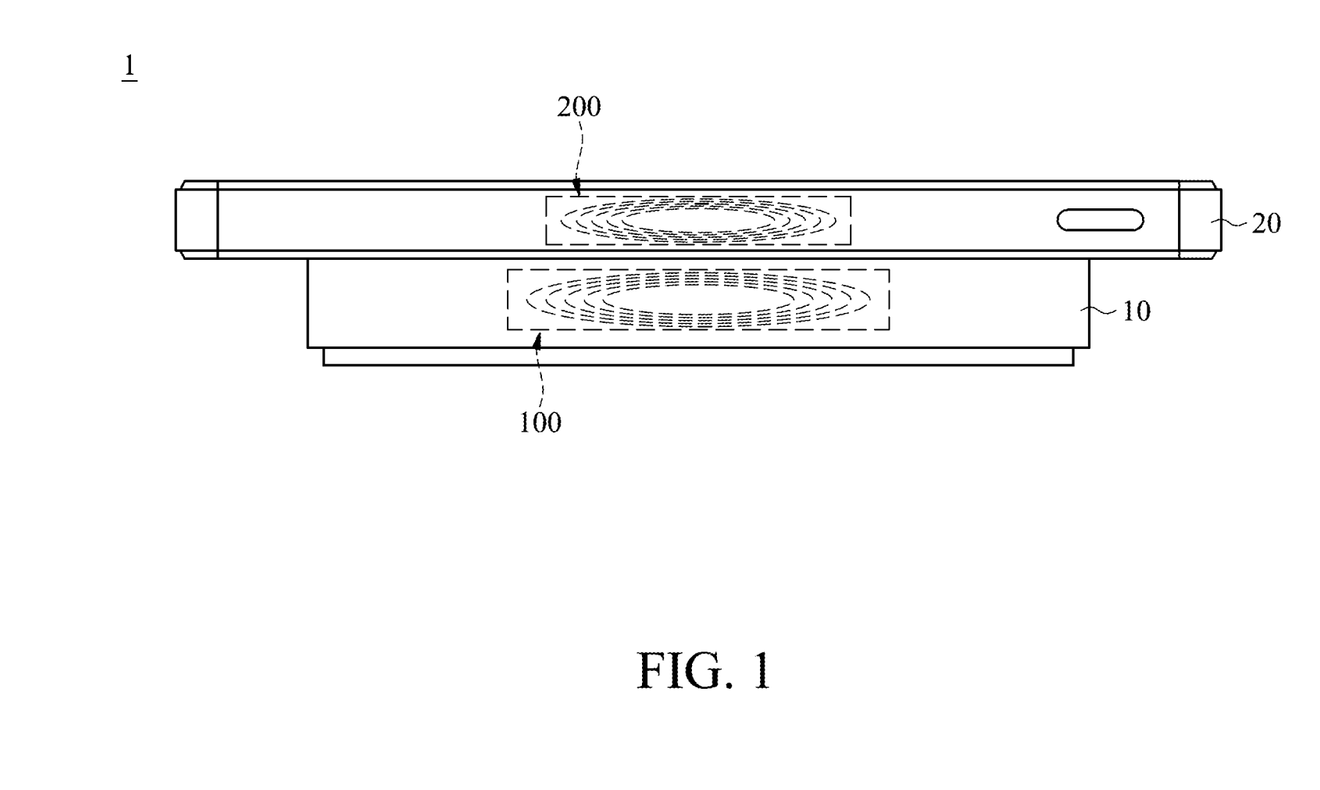
FIG. 1 is a schematic diagram of a wireless system according to an embodiment of the present disclosure.

Please refer to FIG. 1, which is a schematic diagram of a wireless system 1 according to an embodiment of the present disclosure. In this embodiment, the wireless system 1 includes two wireless devices (a transmitting terminal device 10 and a receiving terminal device 20), and the receiving terminal device 20 is disposed on the transmitting terminal device 10. For example, the transmitting terminal device 10 can be a wireless charging pad, including a first coil module 100, and the first coil module 100 can further have a first coil. For example, the receiving terminal device 20 can be a smart phone or a tablet computer, including a second coil module 200, and the second coil module 200 can further have a second coil.

In this embodiment, the first coil can operate as a signal transmitting coil, and the second coil can operate as a signal receiving coil. When the first coil is provided with electricity, the adjacent second coil is induced accordingly to generate electric power, thereby charging the battery (not shown in the figures) in the receiving terminal device 20.

For example, the first coil (or the second coil) can operate as a resonant charging coil based on the standard of the Alliance for Wireless Power (A4WP), but it is not limited thereto. In addition, the first coil (or the second coil) can also operate as an inductive charging coil based on the standard of Wireless Power Consortium (WPC), such as the Qi standard. Therefore, the transmitting terminal device 10 (or the receiving terminal device 20) in this embodiment can respond to different forms of charging so as to enlarge the range of applications. For example, in the case of a close distance (for example, 1 cm or less), the inductive type of operation is used; and at a long distance, a resonance type of operation is used.

Figure 2:
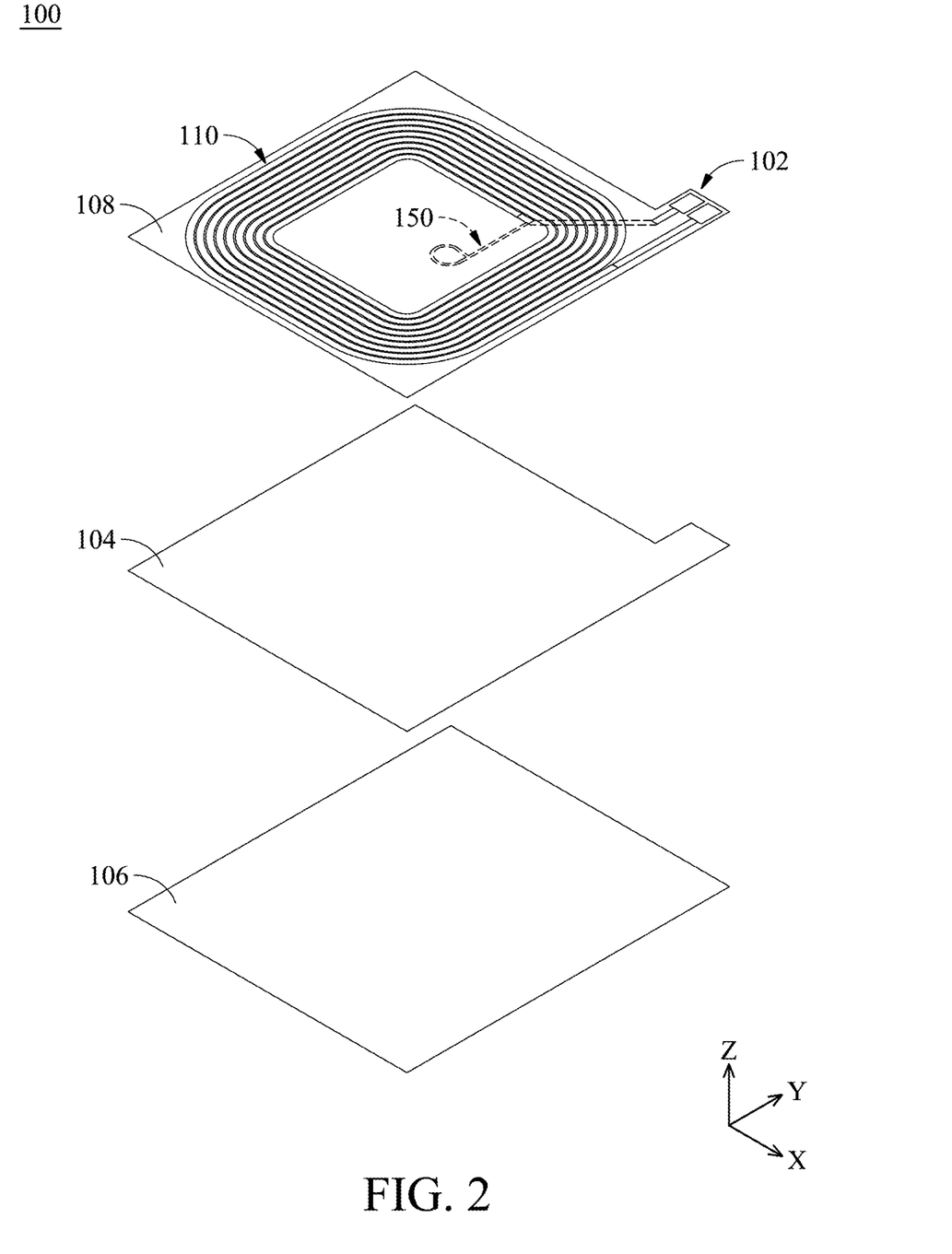
FIG. 2 is an exploded diagram of a first coil module in accordance with an embodiment of the present disclosure.

Please refer to FIG. 2, which is an exploded diagram of a first coil module 100 in accordance with an embodiment of the present disclosure. As shown in FIG. 2, the first coil module 100 can include a coil assembly 102, an adhesive layer 104 and a magnetic conductive plate 106. In this embodiment, the coil assembly 102 is disposed on the magnetic conductive plate 106, and the coil assembly 102 is connected to the magnetic conductive plate 106 by the adhesive layer 104. The adhesive layer 104 can be a tape or any other material that can be used for connection.

In addition, in this embodiment, the magnetic conductive plate 106 may be a ferrite, but it is not limited thereto. For example, in other embodiments, the magnetic conductive plate 106 may also include a nanocrystalline material. The magnetic conductive plate 106 may have a magnetic permeability corresponding to the coil assembly 102 so that the electromagnetic waves of the coil assembly 102 can be more concentrated.

As shown in FIG. 2, the coil assembly 102 includes a substrate 108 and a coil structure 110 (the first coil), and the coil structure 110 is formed on the substrate 108. In this embodiment, the substrate 108 is a flexible circuit board, but it is not limited thereto. Any substrate that can be used to form the coil structure 110 is within the scope of the present disclosure.

Figure 3:
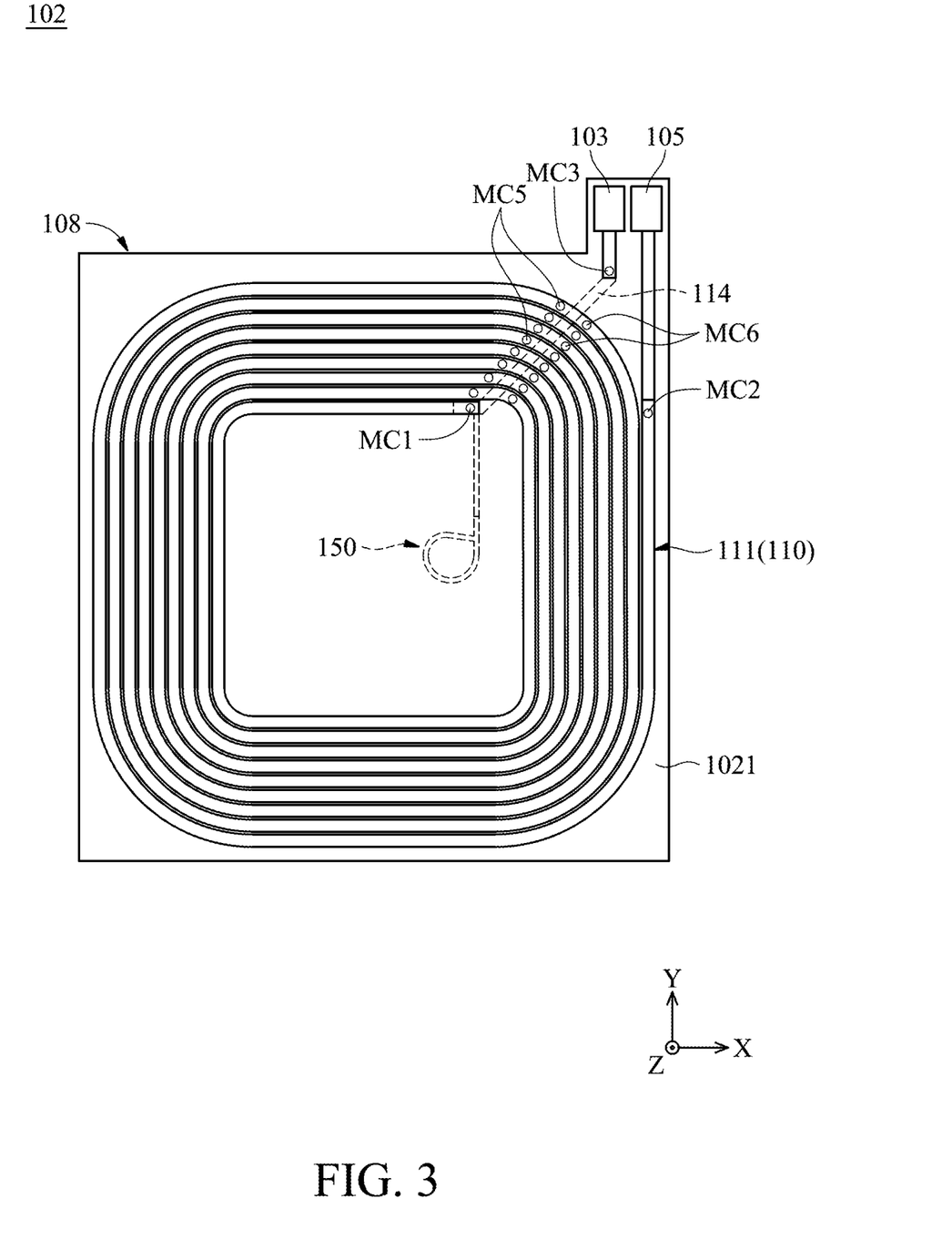
FIG. 3 is a top view of the coil assembly according to an embodiment of the present disclosure.
Figure 4:
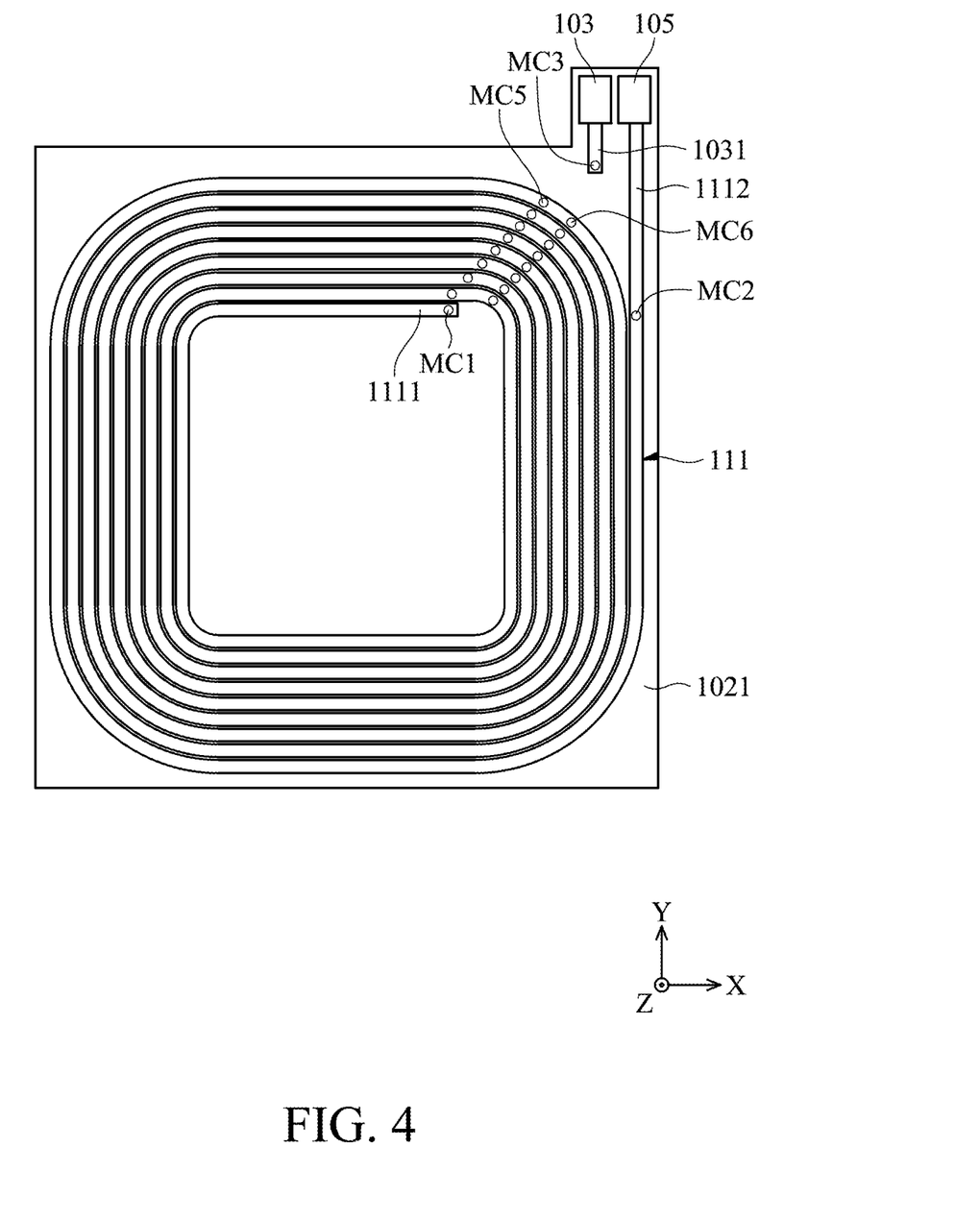
FIG. 4 is a schematic diagram of the structure of the coil assembly on a first plane according to an embodiment of the present disclosure.
Figure 5:
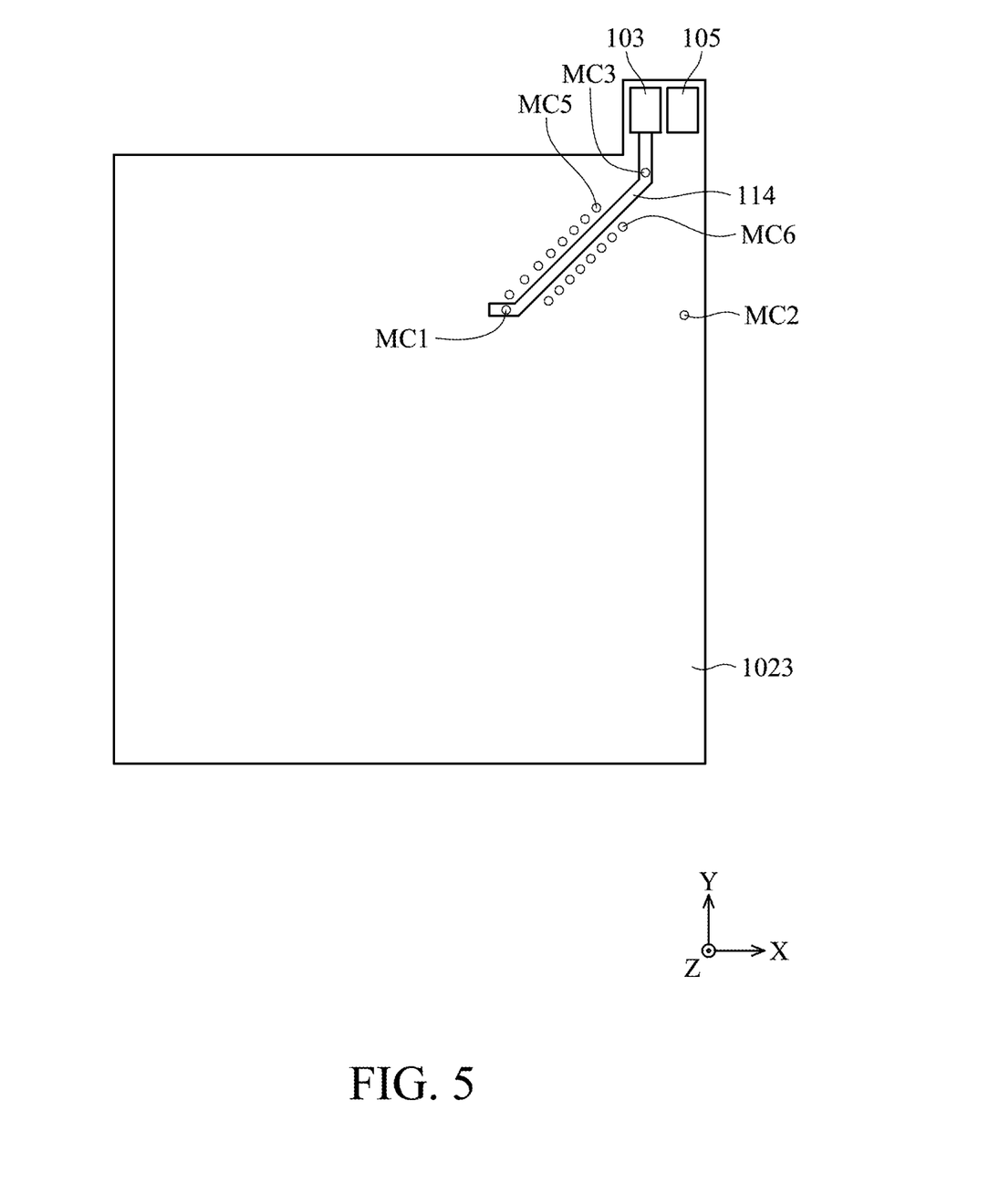
FIG. 5 is a schematic diagram of the structure of the coil assembly on a third plane according to this embodiment of the present disclosure.
Figure 6:
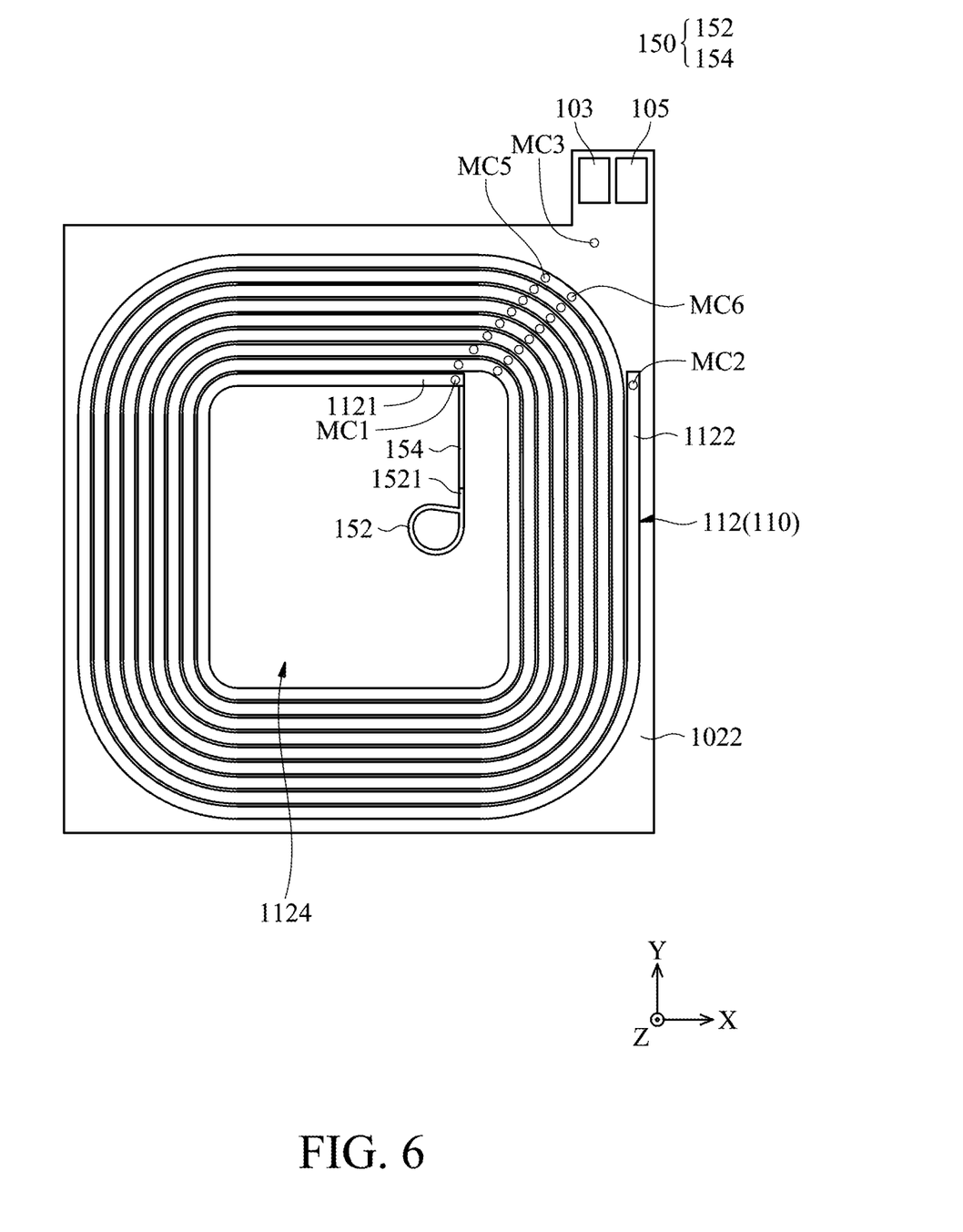
FIG. 6 is a schematic diagram of the structure of the coil assembly on a second plane according to this embodiment of the present disclosure.

Next, please refer to FIG. 3 to FIG. 6. FIG. 3 is a top view of the coil assembly 102 according to an embodiment of the present disclosure. FIG. 4 is a schematic diagram of the structure of the coil assembly 102 on a first plane 1021 according to an embodiment of the present disclosure. FIG. 5 is a schematic diagram of the structure of the coil assembly 102 on a third plane 1023 according to this embodiment of the present disclosure. FIG. 6 is a schematic diagram of the structure of the coil assembly 102 on a second plane 1022 according to this embodiment of the present disclosure.

In this embodiment, the substrate 108 of the coil assembly 102 includes a first layer structure, a second layer structure and a third layer structure which are respectively located in the first plane 1021, the second plane 1022 and the third plane 1023, and the third plane 1023 is located between the first plane 1021 and the second plane 1022. It should be noted that the coil structure 110 in FIG. 6 is located below the second plane 1022, but for the sake of clarity, the coil structure 110 in FIG. 6 is still illustrated by a solid line.

As shown in FIG. 4 to FIG. 6, the coil structure 110 (the first coil) of the coil assembly 102 may include a first metal wire 111 and a second metal wire 112 and a connecting member 114, the first metal wire 111 is disposed on the first plane 1021, the second metal wire 112 is disposed on the second plane 1022, and the connecting member 114 is disposed on the third plane 1023. In addition, as shown in FIG. 3, the coil assembly 102 can further have a first terminal contact 103 and a second terminal contact 105, configured to be electrically connected to an external circuit, such as a control chip.

Next, as shown in FIG. 4, the first metal wire 111 forms a first spiral structure which has a first end 1111 and a second end 1112, and the second end 1112 is connected to the second terminal contact 105. As shown in FIG. 5, one end of the connecting member 114 is connected to the first terminal contact 103. In addition, as shown in FIG. 6, the second metal wire 112 forms a second spiral structure which has a first end 1121 and a second end 1122.

Furthermore, the coil assembly 102 may further include a plurality of metal connectors (also referred to as vias) configured to penetrate the substrate 108 to connect the first metal wire 111 and the second metal wire 112. For example, as shown in FIG. 3 to FIG. 6, the coil assembly 102 includes a metal connector MC1 and a metal connector MC2. The metal connector MC1 is configured to connect the first end 1111 of the first metal wire 111, the connecting member 114 and the first end 1121 of the second metal wire 112. Furthermore, the second end 1122 of the second metal wire 112 is electrically connected to the first metal wire 111 by the metal connector MC2.

As shown in FIG. 4 and FIG. 5, the coil assembly 102 further includes a metal connector MC3 configured to connect the connecting member 114 and an extending wire 1031. In addition, the coil assembly 102 further includes a plurality of metal connectors MC5 and metal connectors MC6 disposed around the connecting member 114. As shown in FIG. 3 to FIG. 6, the plurality of metal connectors MC5 and metal connectors MC6 are respectively disposed on both sides of the connecting member 114. The metal connectors MC5 and the metal connectors MC6 are configured to electrically connect the first metal wire 111 and the second metal wire 112, so that a portion of the first spiral structure of the first metal wire 111 and a portion of the second spiral of the second metal wire 112 may be connected in parallel. Therefore, it can achieve the effect of reducing the overall impedance of the coil assembly 102, and the number of turns of the coil assembly 102 can also be increased.

It should be noted that, in this embodiment, the first coil module 100 may further include a capacitance adjusting unit 150 which is connected to the first coil. For example, as shown in FIG. 6, the capacitance adjusting unit 150 is disposed on the second plane 1022, the capacitance adjusting unit 150 may include at least one closed loop 152 and a connecting wire 154, and the connecting wire 154 is connected between the second metal wire 112 (the first coil) and the closed loop 152.

As shown in FIG. 6, the closed loop 152 may be formed by a wire, and the closed loop 152 only has one connecting end point 1521 configured to connect the connecting wire 154, and the capacitance adjusting unit 150 only includes one connecting wire 154. Furthermore, the second spiral structure of the second metal wire 112 forms a hollow region 1124, and the closed loop 152 is disposed within the hollow region 1124.

By disposing the capacitance adjusting unit 150 in this embodiment, the capacitance value between layers of the first coil (or the capacitance between two adjacent turns of the first coil) can be changed, so as to reduce electromagnetic interference (EMI) to other electronic devices due to the electromagnetic waves generated by the transmitting terminal device 10. In addition, disposing the capacitance adjusting unit 150 does not change the inductance value and the impedance value of the first coil. That is, it does not affect the performance of the transmitting terminal device 10 during wireless charging.

Figure 7:
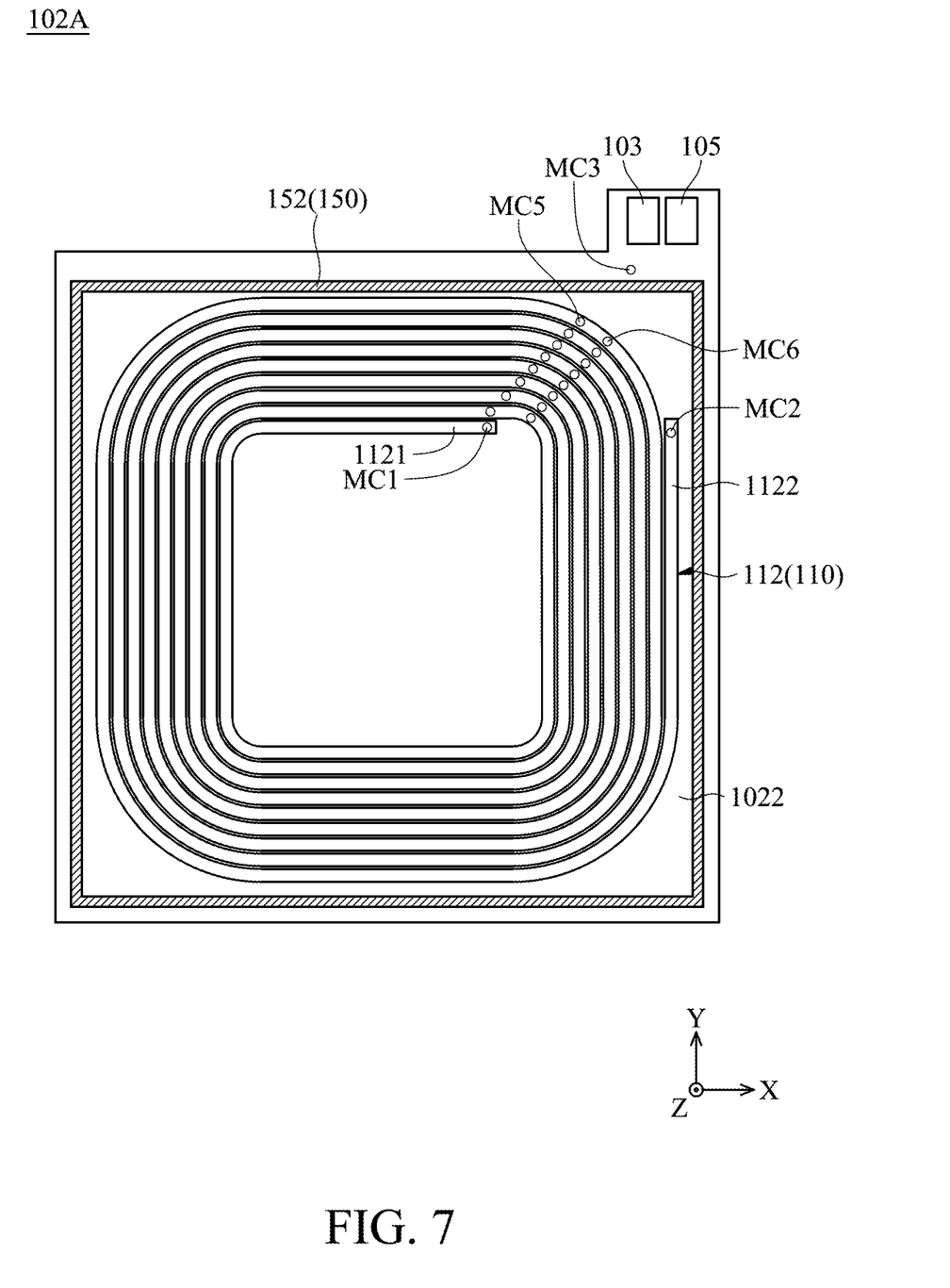
FIG. 7 is a schematic structural diagram of a coil assembly on a second plane according to another embodiment of the present disclosure.

Please refer to FIG. 7, which is a schematic structural diagram of a coil assembly 102A on a second plane 1022 according to another embodiment of the present disclosure.

The coil assembly 102A in this embodiment is similar to the coil assembly 102. The difference between them is that the capacitance adjusting unit 150 in this embodiment only includes the closed loop 152 which surrounds the second metal wire 112 (the first coil), and the capacitance adjusting unit 150 is electrically independent from the first coil.

Figure 8:
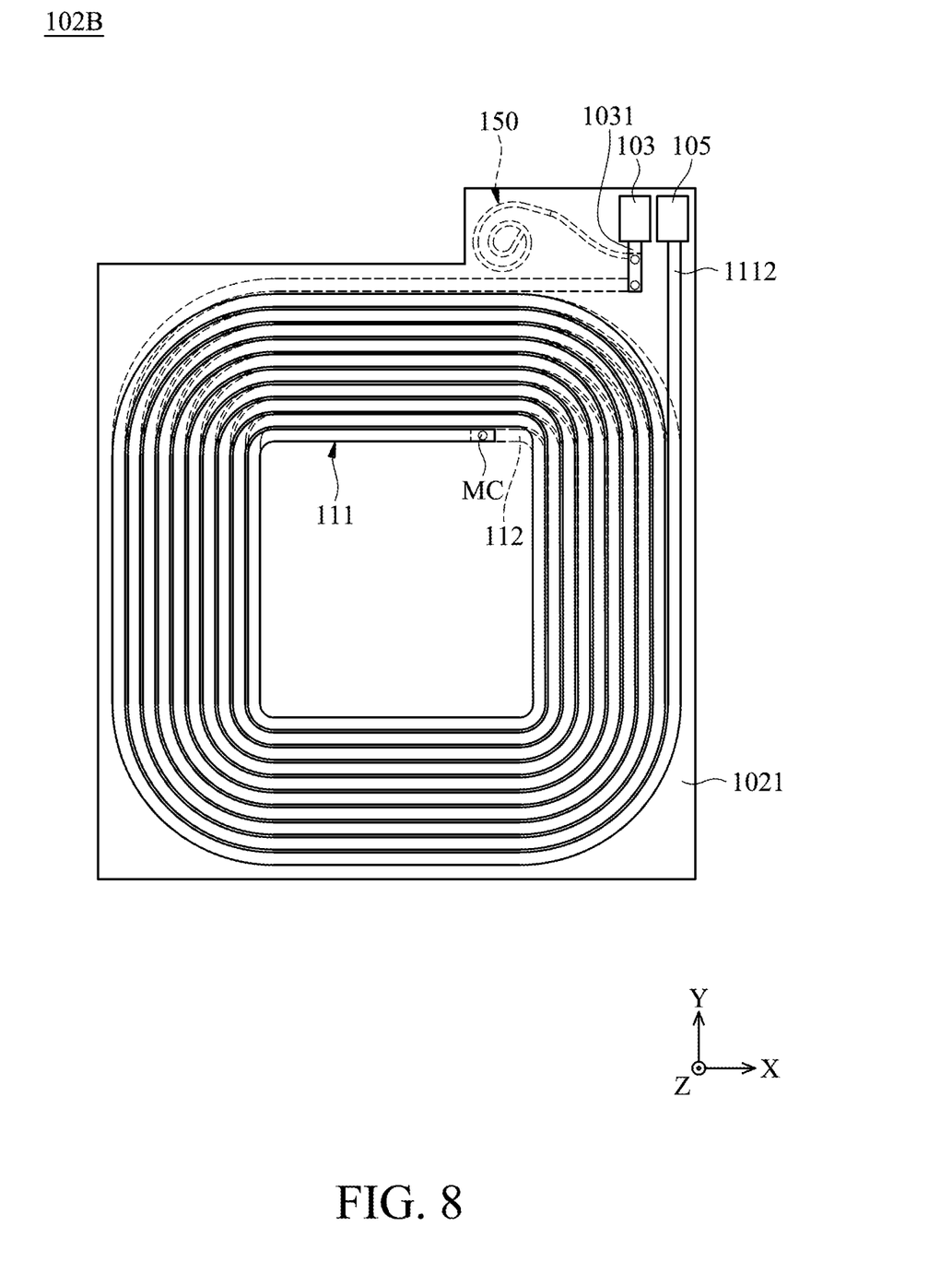
FIG. 8 is a top view of a coil assembly of a wireless device according to another embodiment of the present disclosure.
Figure 9:
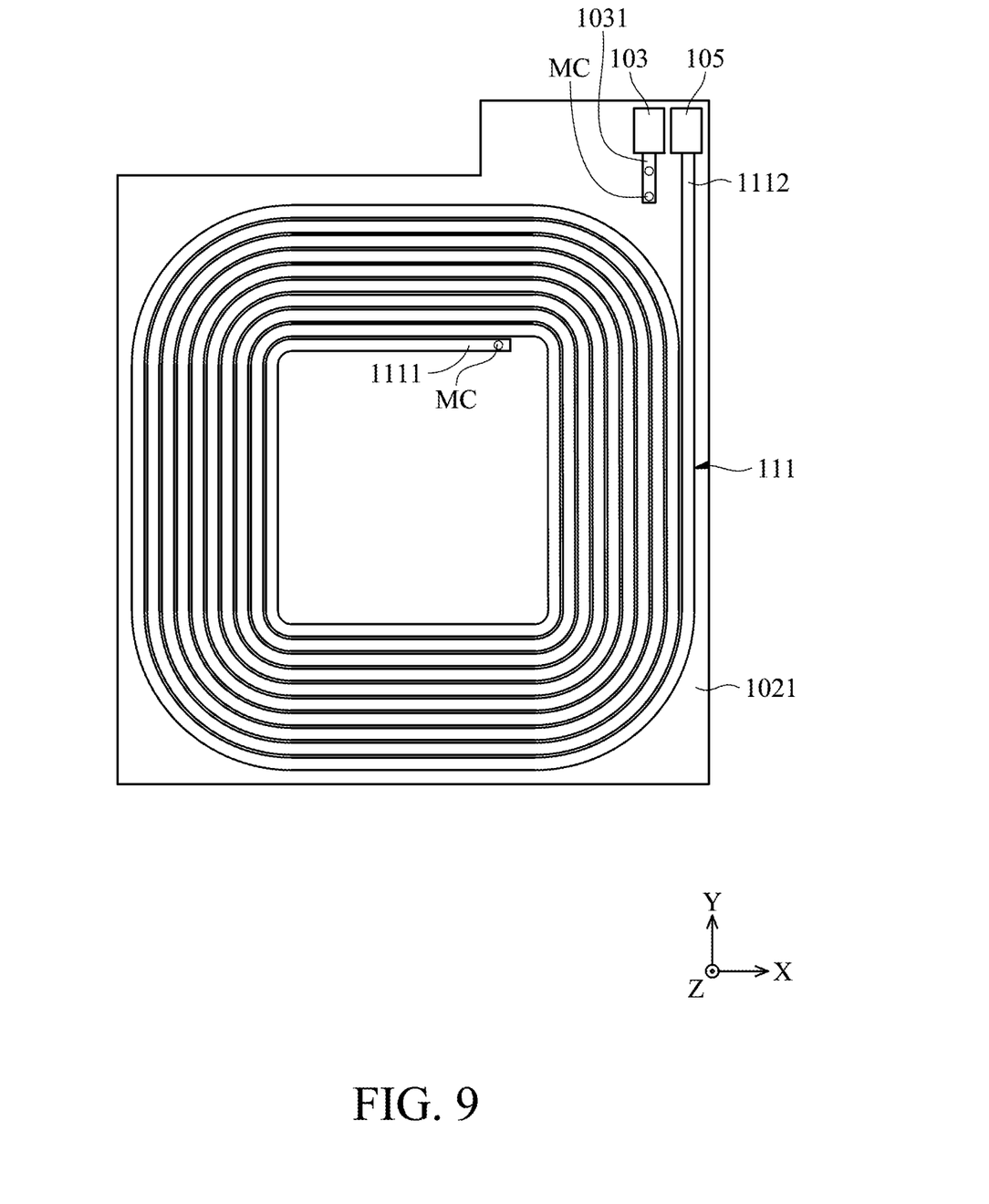
FIG. 9 is a schematic diagram of an upper layer structure of the coil assembly on the first plane according to the embodiment of the present disclosure.
Figure 10:
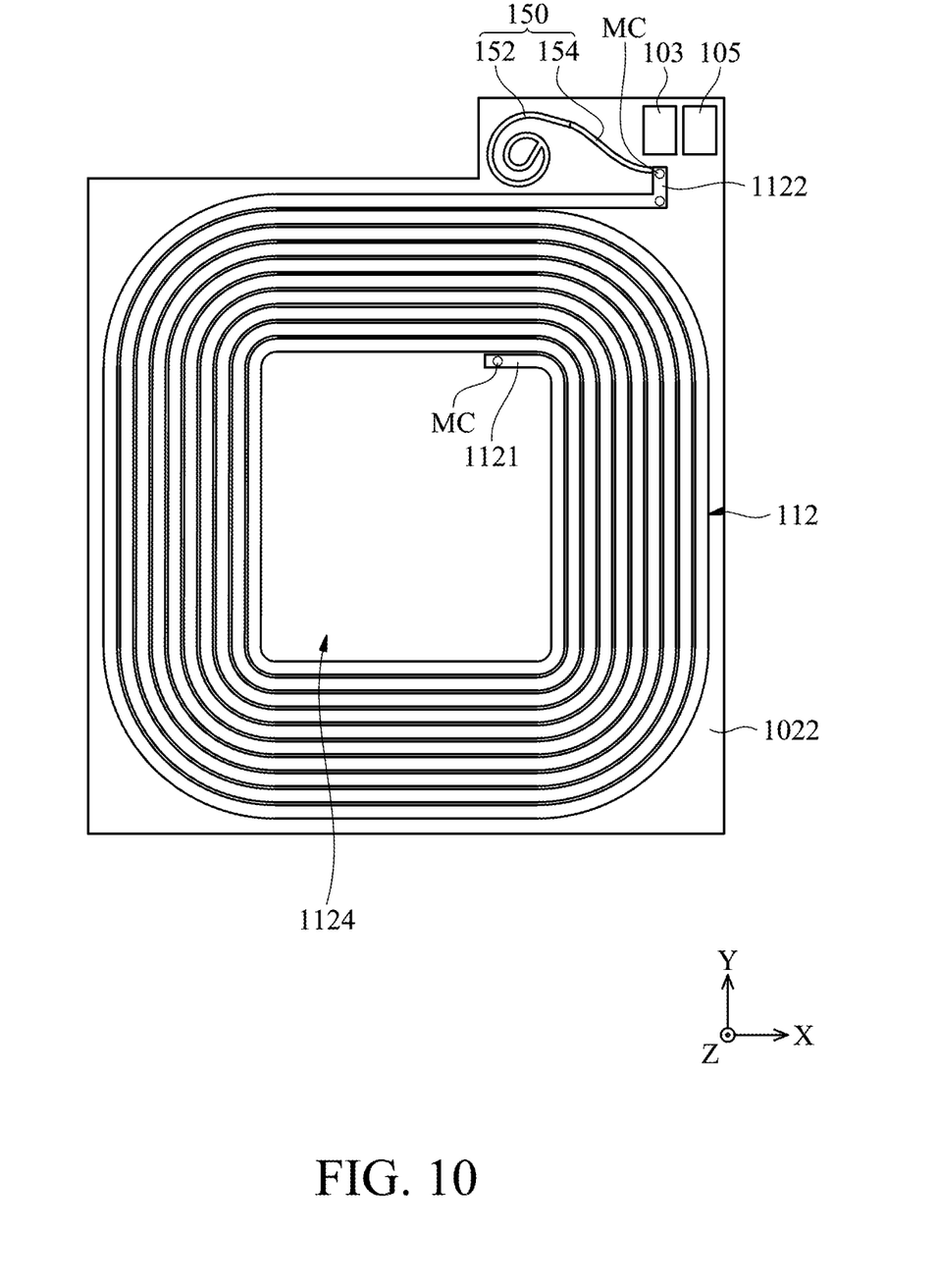
FIG. 10 is a schematic diagram of a lower layer structure of the coil assembly on the second plane according to this embodiment of the present disclosure.

Please refer to FIG. 8 to FIG. 10. FIG. 8 is a top view of a coil assembly 102B of a wireless device according to another embodiment of the present disclosure, FIG. 9 is a schematic diagram of an upper layer structure of the coil assembly 102B on the first plane 1021 according to the embodiment of the present disclosure, and FIG. 10 is a schematic diagram of a lower layer structure of the coil assembly 102B on the second plane 1022 according to this embodiment of the present disclosure.

In this embodiment, as shown in FIG. 9 and FIG. 10, the winding direction of the first metal wire 111 is opposite to the winding direction of the second metal wire 112, and they are connected to each other in series by the metal connector MC located within the hollow region 1124. The first end 1111 of the first metal wire 111 is electrically connected to the first end 1121 of the second metal wire 112 by the metal connector MC. In this embodiment, the first metal wire 111 has a first spiral structure, and the second metal wire 112 has a second spiral structure.

In addition, as shown in FIG. 8 and FIG. 10, the coil assembly 102B further has an extending wire 1031, and the second end 1122 of the second metal wire 112 is electrically connected to the extending wire 1031 and the first terminal contact 103 by the metal connector MC. Furthermore, as shown in FIG. 8 and FIG. 9, the second end 1112 of the first metal wire 111 is connected to the second terminal contact 105.

It should be noted that the second spiral structure formed by the second metal wire 112 has a hollow region 1124, and the capacitance adjusting unit 150 is disposed outside the hollow region 1124. Specifically, the closed loop 152 is adjacent to the first terminal contact 103, and the closed loop 152 is connected to the second end 1122 of the second metal wire 112 by the connecting wire 154. The number of turns of the closed loop 152 is two or more, but it is not limited thereto. The number of turns of the closed loop 152 may depend on the capacitance value to be adjusted.

It can be known from the foregoing embodiments that whether the first metal wire 111 and the second metal wire 112 are connected in series or in parallel, the capacitance adjusting unit 150 can be used to adjust the capacitance value of the first coil to reduce the problem of electromagnetic interference resulting from the wireless device (for example, the transmitting terminal device 10).

Figure 11:
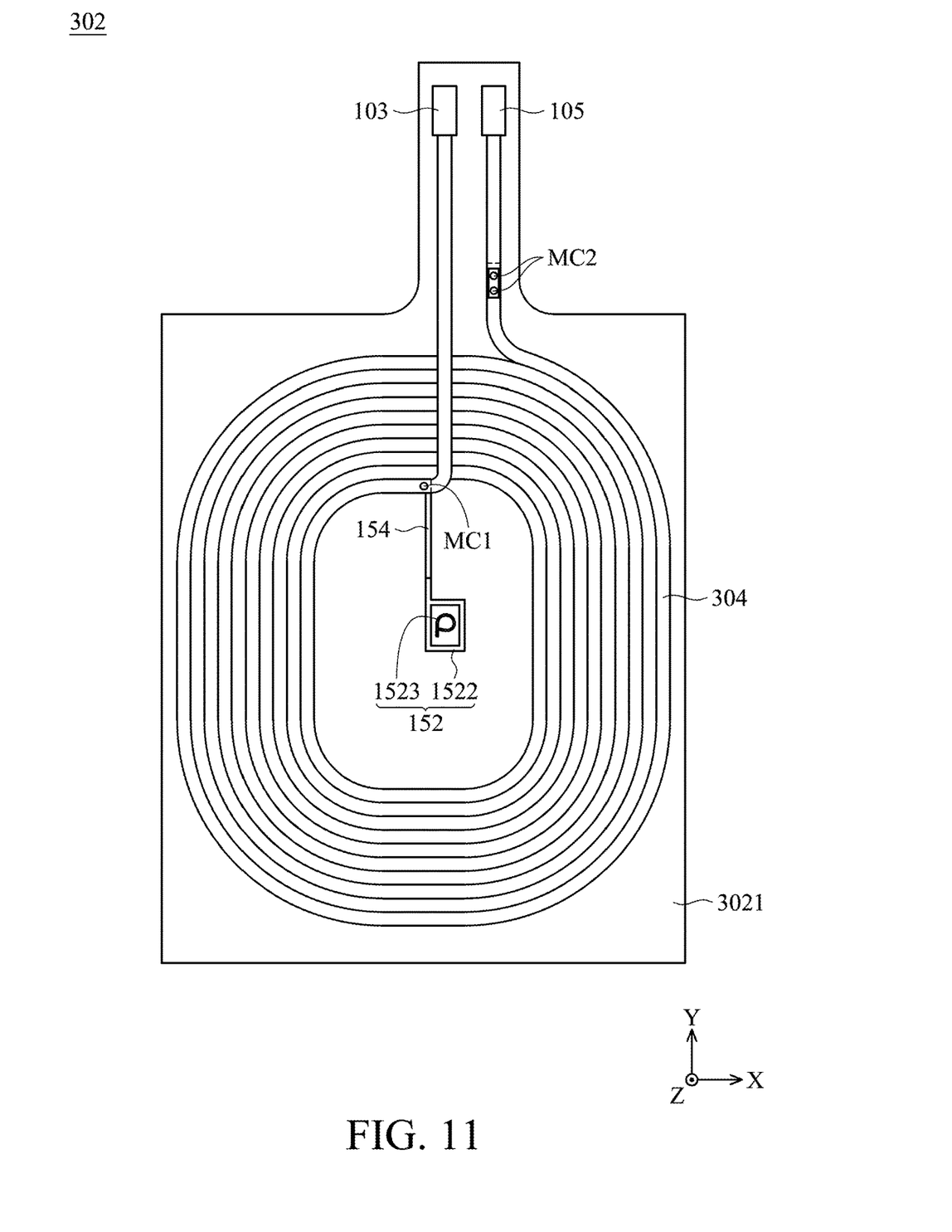
FIG. 11 is a top view of a coil assembly of a wireless device according to another embodiment of the present disclosure.
Figure 12:
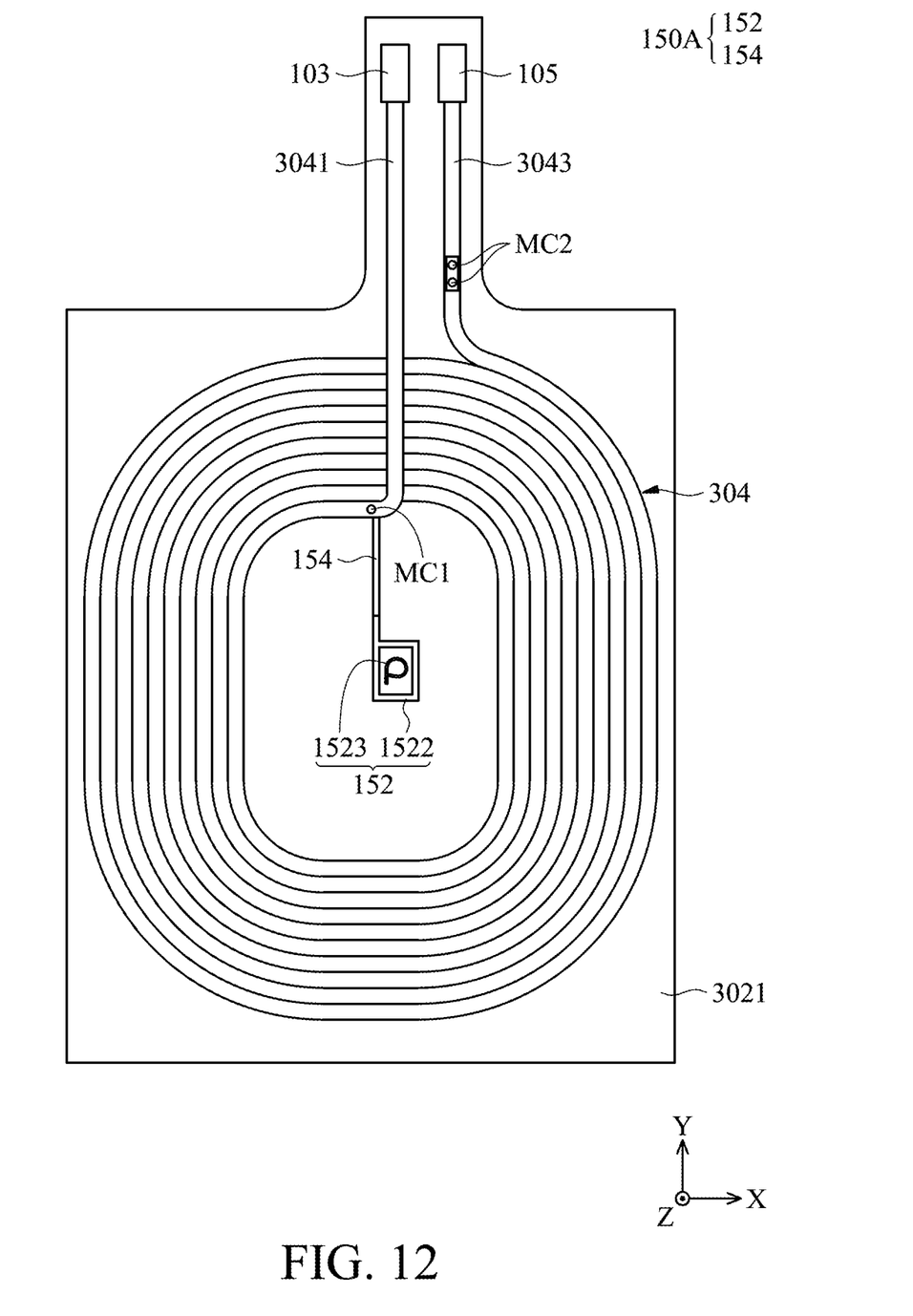
FIG. 12 is a schematic diagram of an upper layer structure of the coil assembly on a first plane according to the embodiment of the present disclosure.
Figure 13:
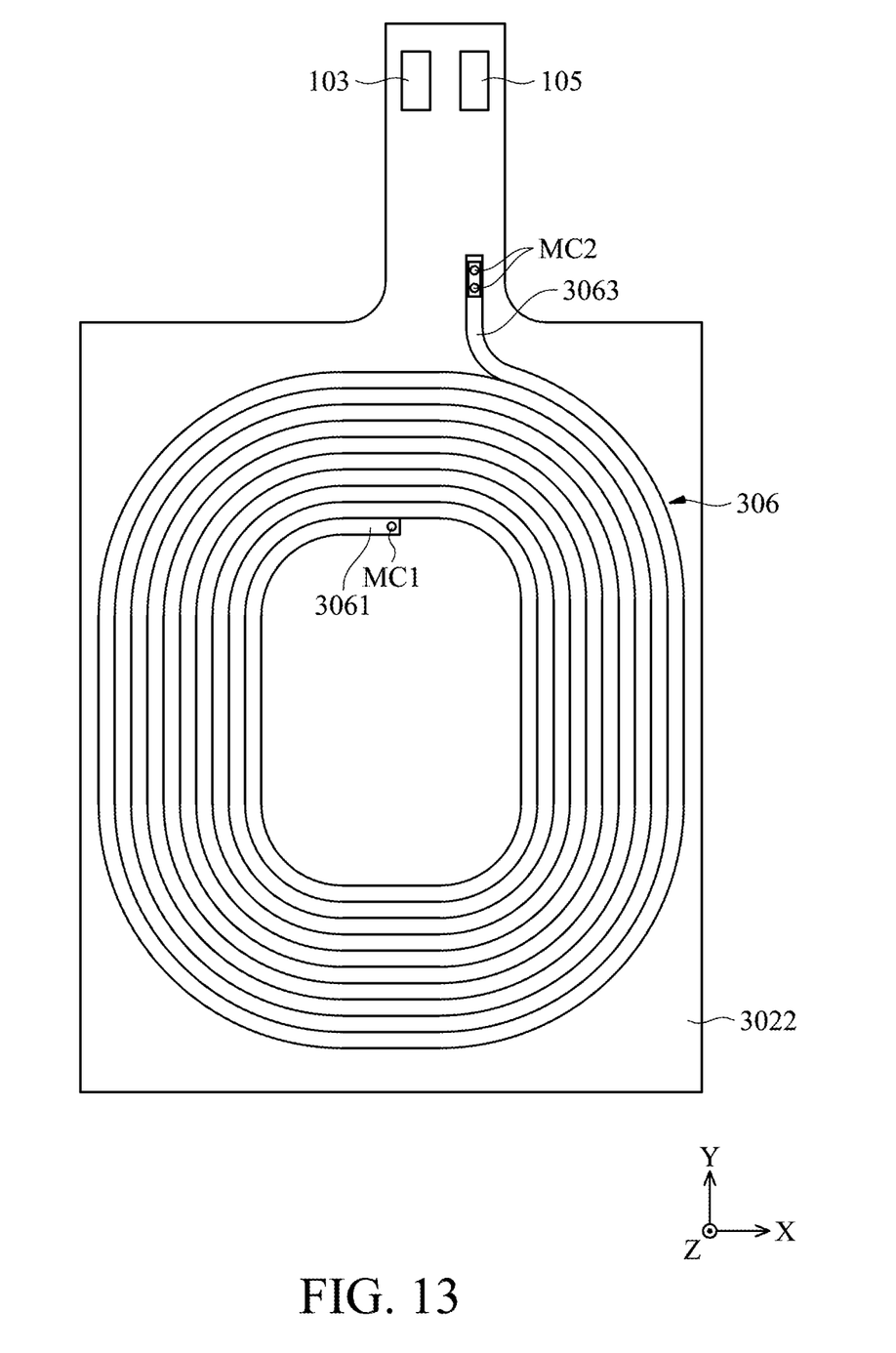
FIG. 13 is a schematic diagram of a lower layer structure of the coil assembly on a second plane according to this embodiment of the present disclosure.

Please refer to FIG. 11 to FIG. 13. FIG. 11 is a top view of a coil assembly 302 of a wireless device according to another embodiment of the present disclosure, FIG. 12 is a schematic diagram of an upper layer structure of the coil assembly 302 on a first plane 3021 according to the embodiment of the present disclosure, and FIG. 13 is a schematic diagram of a lower layer structure of the coil assembly 302 on a second plane 3022 according to this embodiment of the present disclosure.

As shown in FIG. 12, the first metal wire 304 has a first end 3041 and a second end 3043 which are respectively connected to the first terminal contact 103 and the second terminal contact 105. Furthermore, as shown in FIG. 13, the second metal wire 306 has a first end 3061 and a second end 3063. The first end 3061 is connected to the first metal wire 304 by a metal connector MC1, and the second end 3063 is connected to the second end 3043 of the first metal wire 304 by metal connectors MC2.

It should be noted that the capacitance adjusting unit 150A in this embodiment is disposed on the first plane 3021 and is connected to the first end 3041 of the first metal wire 304 by the connecting wire 154. The closed loop 152 includes a first closed wiring 1522 and a second closed wiring 1523. The first closed wiring 1522 is connected to the connecting wire 154, and the second closed wiring 1523 is located within the first closed wiring 1522 and is not connected to the first closed wiring 1522.

Based on the structural design of the capacitance adjusting unit 150A in this embodiment, the effect of adjusting the capacitance value of the first coil (consisting of the first metal wire 304 and the second metal wire 306) by the capacitance adjusting unit can be further improved.

Figure 14:
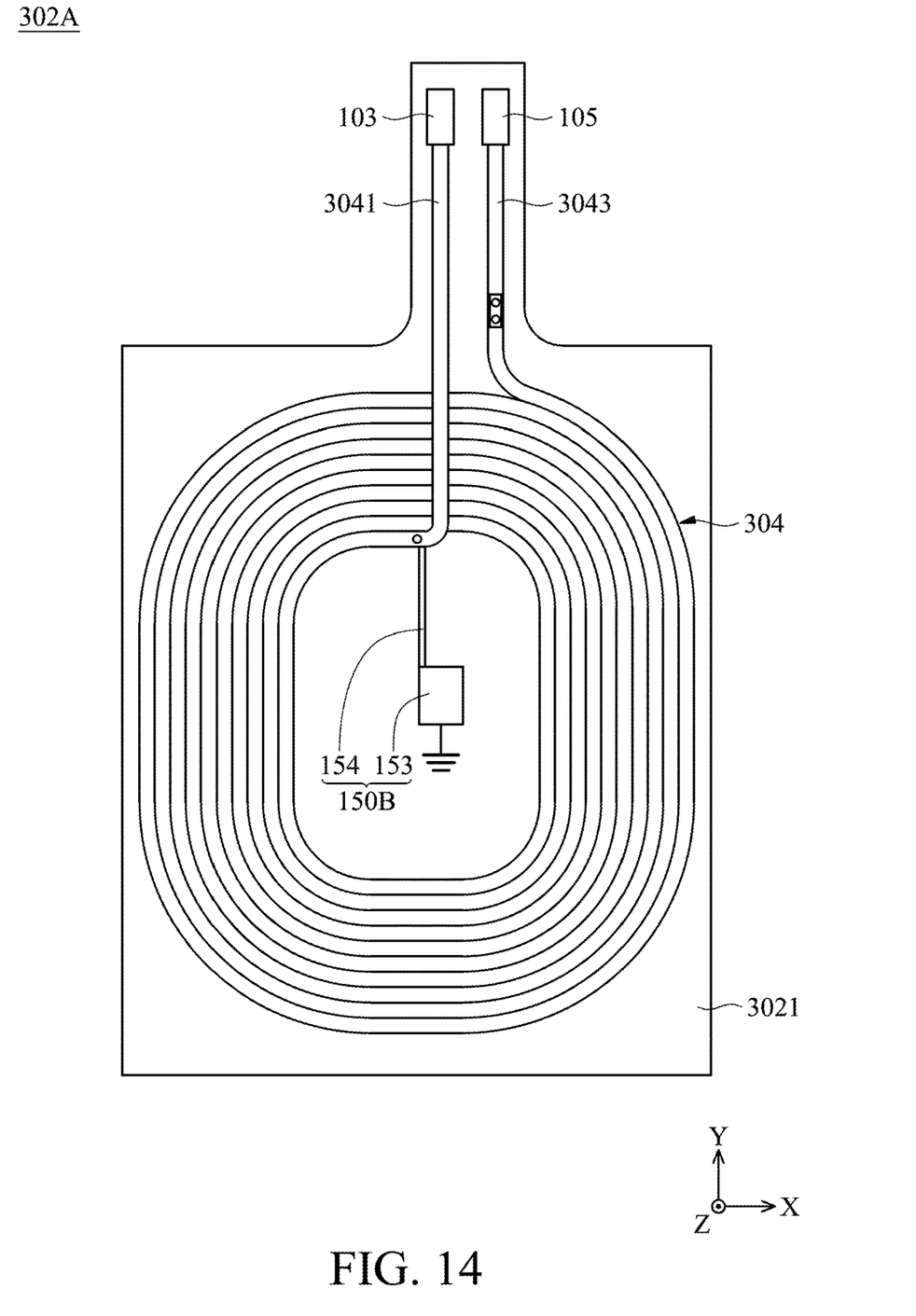
FIG. 14 is a schematic structural diagram of a coil assembly on the first plane according to another embodiment of the present disclosure.

Please refer to FIG. 14, which is a schematic structural diagram of a coil assembly 302A on the first plane 3021 according to another embodiment of the present disclosure. The coil assembly 302A in this embodiment is similar to the coil assembly 302. The difference between them is that the capacitance adjusting unit 150B in this embodiment includes a variable capacitor 153. One end of the variable capacitor 153 is connected to the connecting wire 154, and the other end of the variable capacitor 153 is electrically grounded.

Based on the configuration of the capacitance adjusting unit 150B in this embodiment, the capacitance value of the first coil of the coil assembly 302A can be adjusted immediately, so as to further reduce the effect of electromagnetic interference generated by the coil assembly 302A.

It should be noted that, in the foregoing embodiments, the capacitance adjusting unit 150 is disposed in the transmitting terminal device 10, but it may be disposed in the receiving terminal device 20 in other embodiments. The location of the capacitance adjusting unit 150 can be determined by practical needs. For example, when the capacitance adjusting unit 150 is disposed in the transmitting terminal device 10, the purpose of miniaturizing the receiving terminal device 20 can be achieved. In addition, when the capacitance adjusting unit 150 is disposed in the receiving terminal device 20, the receiving terminal device 20 can be matched with different types of transmitting terminal devices (for example, with a transmitting terminal device having no capacitance adjusting unit).

The present disclosure provides a wireless system including a first coil and a second coil. When the first coil is provided with electricity, the second coil is configured to sense the first coil to generate electric power. In various embodiments of the present disclosure, the wireless system may include a capacitance adjusting unit 150 configured to be electrically connected to the first coil (or the second coil) to change the capacitance value between layers of the first coil, thereby reducing the electromagnetic interference to other electronic devices due to the electromagnetic waves generated by the transmitting terminal device 10.

In addition, disposing the capacitance adjusting unit 150 does not change the inductance value and the impedance value of the first coil, and thus does not affect the performance of the transmitting terminal device 10 during wireless charging. In some embodiments, the capacitance adjusting unit 150 can include a closed loop and a connecting wire. The closed loop is formed by a wire, and the closed loop only has one connecting end point which is connected to the connecting wire.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A wireless system, comprising:
a first coil;
a second coil, configured to sense the first coil; and
a capacitance adjusting unit, connected to the first coil, wherein the capacitance adjusting unit includes at least one closed loop and a connecting wire, and the connecting wire is connected between the first coil and the closed loop;
wherein the closed loop includes a first closed wiring and a second closed wiring, and the second closed wiring is located in the first closed wiring and is not connected to the first closed wiring.

2. The wireless system as claimed in claim 1, wherein the closed loop only has one connecting end point configured to be connected to the connecting wire.

3. The wireless system as claimed in claim 1, wherein the first coil includes a spiral structure, and the spiral structure forms a hollow region, wherein the closed loop is disposed in the hollow region.

4. The wireless system as claimed in claim 1, wherein the first coil includes a spiral structure, and the spiral structure forms a hollow region, wherein the closed loop is disposed outside the hollow region.

5. The wireless system as claimed in claim 4, wherein number of turns in the closed loop is at least two.

6. The wireless system as claimed in claim 1, wherein the first coil includes a first metal wire and a second metal wire respectively disposed on a first plane and a second plane, and a winding direction of the first metal wire is opposite to a winding direction of the second metal wire.

7. The wireless system as claimed in claim 6, wherein the first metal wire has a first end, the second metal wire has a first end and a second end, and the first end of the first metal wire is electrically connected to the first end of the second metal wire, so that the first metal wire is connected to the second wire in series.

8. The wireless system as claimed in claim 7, wherein the closed loop is connected to the second end of the second metal wire by the connecting wire.

9. The wireless system as claimed in claim 1, wherein the first coil has a signal transmitting coil.

10. The wireless system as claimed in claim 1, wherein the first coil has a signal receiving coil.

11. A wireless system, comprising:
a first coil;
a second coil, configured to sense the first coil; and
a capacitance adjusting unit, surrounding the first coil, wherein the capacitance adjusting unit includes at least one closed loop and is electrically independent from the first coil;
wherein the closed loop includes a first closed wiring and a second closed wiring, and the second closed wiring is located in the first closed wiring and is not connected to the first closed wiring.

12. A wireless device, comprising:
a first coil, comprising:
a first metal wire, disposed on a first plane and having a first spiral structure; and
a second metal wire, disposed on a second plane and having a second spiral structure, wherein the second metal wire is electrically connected to the first metal wire; and
a capacitance adjusting unit, connected to the first coil, wherein the capacitance adjusting unit includes at least one closed loop and a connecting wire, and the connecting wire is connected between the first coil and the closed loop;
wherein the closed loop includes a first closed wiring and a second closed wiring, and the second closed wiring is located in the first closed wiring and is not connected to the first closed wiring.

* * * * *